United States Patent Office 3,676,172
Patented July 11, 1972

3,676,172
VAPOR COALESCENCE OF POWDER COATINGS
John W. Van Dyk, Wilmington, Del., and Dao-Tsing Wu, Villanova, Pa., assignors to E. I. du Pont de Nemours and Company, Wilmington, Del.
No Drawing. Continuation-in-part of abandoned application Ser. No. 733,275, May 31, 1968. This application Dec. 14, 1970, Ser. No. 98,131
Int. Cl. B44d 1/48, 1/094
U.S. Cl. 117—21                                17 Claims

ABSTRACT OF THE DISCLOSURE

The process for forming a continuous polymeric coating on a substrate comprises the following steps:
(1) applying a coating of a thermoplastic polymeric powder on a substrate,
(2) exposing the coating to a partial pressure of a coalescing vapor for the polymeric powder, and
(3) absorbing sufficient vapor into the coating to coalesce the powder particles and heating the coalesced coating to remove solvent.

CROSS REFERENCE TO RELATED APPLICATIONS

This application is a continuation-in-part application of our co-pending application Ser. No. 733,275, now abandoned, filed May 31, 1968.

BACKGROUND OF THE INVENTION

This invention is related to a process for coalescing thermoplastic polymer powder coatings and in particular to a process for coalescing thermoplastic polymer powder coatings into a continuous film by exposing the coatings to coalescing vapors.

Coatings of a polymeric powder are known in the art and are applied by a variety of methods such as by electrostatic spraying in which the powdered polymer particles are charged as they are sprayed onto a substrate which is grounded, or by an electrostatic fluidized bed in which the powdered polymer particles are electrically charged in an air fluidized bed and the substrate that is to be coated is immersed in this bed; or by immersing a heated substrate into an air fluidized bed. The polymeric powder coating may also be applied by flame spraying, i.e., the powder is passed through a flame and partially melted before it is deposited on the substrate.

Powder coatings have many advantages over liquid coating, e.g., a thick coating can be applied without sagging of the coating, edges can be uniformly coated with the rest of the substrate and there are no air pollution problems as exist with solvent coating compositions. For these reasons, and many others, industry would widely accept the use of powder coatings if coalescence of these coatings was not a problem. Present methods for coalescing the coating comprise heating the coated substrate to a high temperature to coalesce the polymer powder particles. This technique precludes the use of substrates other than metal such as wood, plastic and the like. Also, heat coalescence of the coating often results in a rough coating which then must be sanded and refinished by conventional coating techniques.

The novel process of this invention provides a technique which coalesces the polymer powder coating at a low temperature without the use of a high temperature bake and results in a smooth coating having an excellent appearance. Also, the novel process of this invention since it does not require a high temperature bake allows for the use of almost any substrate such as wood, plastic, and the like to be coated with a polymer powder coating.

STATEMENT OF THE INVENTION

The process of this invention for forming a continuous polymeric coating on a substrate comprises:
(1) Applying a coating of an essentially thermoplastic polymeric powder to a substrate,
(2) Exposing the coating to a selected partial pressure of a coalescing vapor for the polymer powder, where the partial pressure range of said vapor is at least 0.5 inch of mercury and up to 0.99 times the saturation vapor pressure measured at the temperature at which the coating is being exposed;
(3) Absorbing sufficient vapor into the coating of the polymeric powder to cause the powder particles to coalesce into a continuous film; and
(4) Drying the coalesced coating to remove solvent vapors.

DESCRIPTION OF THE INVENTION

"Essentially thermoplastic" as used herein refers to a polymer that is primarily linear in structure when the polymeric powder is applied to a substrate but the polymeric powder can be cross-linked after it has been applied. The polymeric powder can be a linear polymer or a graft copolymer and still have these essentially thermoplastic characteristics and be coalesced according to the novel process of this invention.

The coalescing vapor is a vapor that is absorbed into the polymeric powder and causes the polymer particles to coalesce and form a continuous tough and durable film. Preferably, sufficient vapor is absorbed to cause the polymer particles to coalesce and flow to form a smooth and even surface. The vapor in the liquid form need not be, but preferably is, a good solvent for the thermoplastic polymer, but the vapor only need be soluble to a sufficient degree in the polymer to cause the polymer particles to coalesce. Sufficient vapors should be absorbed to cause the polymer particles to coalesce and reduce the viscosity measured at a low shear rate of the polymer surface to less than 2,000,000 poises, preferably between 50,000–2,000,000 poises. This allows the coalesced polymer film to flow to form a smooth and even surface. To obtain particularly good results, the viscosity of the polymer after coalescence should be reduced to about 100,000–1,000,000 poises.

To avoid condensation of the coalescing vapor on the article being treated, the partial pressure of the vapor is held between 0.5 inch of mercury (Hg) and 0.99 times the saturation vapor pressure. The saturation vapor pressure is determined at the temperature at which the article is being treated which, preferably, is about 20° C.–200° C., and more preferably, about 25–100° C. Also, to avoid condensation of the vapor, the article being treated should be at the temperature of the vapor or at a slightly higher temperature.

The preferred partial pressure used in the process is at least 5 inches of mercury and up to 0.97 times the saturation vapor pressure since this range gives a high quality product. This preferred partial pressure range usually is about 5–25 inches Hg for most vapors.

The time the powder coated article is exposed to the coalescing vapor is preferably about 15 seconds–2 hours, and more preferably, 30 seconds–5 minutes for most vapors. The time of exposure to the vapor atmosphere is determined by the rate at which the vapors are absorbed into the polymeric particles.

An optimum partial pressure for a vapor and exposure time for a particular vapor is chosen by simple experimentation and often it is preferred that this partial pressure is controlled within about ±3% of the optimum value but within the aforementioned partial pressure range. By controlling the partial pressure near its optimum value, condensation of vapors on the polymeric powder coating is eliminated and the products resulting from this process have a smooth and even surface.

After the polymeric powder coated surface of the article has been exposed, it is dried at room temperature or preferably at 65–150° C. for about 1 minute–1 hour to remove the vapor. Optimum drying conditions vary from polymer to polymer and for different vapors and can be easily determined by one skilled in the art.

The type of coalescing vapor used depends on the polymer used for the powder coating. The type of vapor necessary and preferred for a particular polymer can be readily determined by one skilled by a simple experimentation. The following are typical solvents which when vaporized to give a partial pressure within the aforementioned limits can be used in the novel process of this invention with a wide variety of polymers that form the surface of the article being treated: methylene chloride, acetone, benzene, acetonitrile, tetrahydrofuran, methanol, chloroform, carbon tetrachloride, dichloroethane, trichloroethylene, tetrachloroethylene, 1,1,2-trichloroethane, 1,1,1-trichloroethane ethyl acetate, butyl acetate, methyl methacrylate, toluene, methyl isobutyl ketone, dimethyl formamide, dimethyl acetamide, ethylene glycol monoethyl ether acetate, trifluoroacetic acid and mixtures of the above solvents. One preferred mixture of solvents is a blend of ethylene glycol monoethyl ether acetate, and methylene chloride. As a safety precaution, water vapor, nitrogen and other inert gases can be used as the diluent gas which are often preferred to air.

Thermoplastic powder polymer coating compositions can be prepared by a variety of methods known to one skilled in the art. For example, a polymer solution or a polymer dispersion which may be pigmented is sprayed into a chamber heated with hot air; and the volatile liquid flashes off and is separated from the finely divided polymer particles which are collected and used for a powder coating. Another technique which can be used to form a polymeric powder is to spray a polymer solution into a non-solvent for the polymer and then filter the polymeric particles from the non-solvent. The collected polymeric particles of the latter method are usually in the form of a filter cake and must be ground to give a finely divided polymeric powder useful for powder coating.

These polymeric powders can readily be applied to a substrate to form a powder coating by any one of the techniques described herein such as by electrostatic spraying, by electrostatic fluidized bed or by an air fluidized bed. Also, a polymeric powder coating can be applied from a latex of a hard polymer, e.g., a latex of polymethyl methacrylate or polyvinyl chloride, the hard polymer particles will not coalesce when the latex is dried but a coating very similar to a powder coating results. The novel process of this invention can be used to coalesce these particles into a uniform coating.

These polymeric powders can readily be applied to a substrate to form a powder coating by any one of the techniques described herein such as by electrostatic spraying, by electrostatic fluidized bed or by an air fluidized bed. Also, a polymeric powder coating can be applied from a latex of a hard polymer, e.g., a latex of polymethyl methacrylate or polyvinyl chloride, the hard polymer particles will not coalesce when the latex is dried but a coating very similar to a powder coating results. The novel process of this invention can be used to coalesce these particles into a uniform coating.

It may be desirable to apply the coalescing vapor to the powder coating by using a vapor gun but care must be taken to control the partial pressure of the vapor at the surface of the coating within the aforementioned partial pressure range. Also, it may be desirable to pass the powder coated object through an assembly of spray nozzles to coalesce the coating. A typical example of the above techniques is as follows: A powder coating is applied to an automobile body on an assembly line and the coated automobile body passes through an assembly of spray nozzles which apply solvent vapor within the aforementioned partial pressure range; the coalesced coating is then baked; spot repairs of any damaged areas of the coating can be made by applying the powder coating to the damaged area and the coating is then coalesced with solvent vapors from a vapor gun.

The following discussion is directed to the variety of the thermoplastic polymeric materials that can be formed into powders by the aforementioned techniques and can be applied as powder coatings to wood, metal, plastic substrates and the like and which can be coalesced into a continuous film by the process of this invention.

The novel process of this invention is applicable to coalesce clear or pigmented acrylic polymer powder coatings. These acrylic polymers which can be formed readily into powder coatings should have a glass transition temperature of at least 20° C. and up to 110° C. and contain as the main constituent polymerized alkyl esters of acrylic acid and/or methacrylic acid wherein the alkyl groups have 1–12 carbon atoms or a mixture of these esters can be used. These acrylic polymers can contain up to 30% by weight of other copolymerizable monomers, such as styrene, acrylonitrile and methacrylonitrile. Also, these acrylic polymers can be admixed with up to 50% by weight of plasticizers and/or cross-linking agents; however, the resulting powder particles must be sufficiently hard to form non-adhering particles at ambient temperatures.

One preferred class of acrylic polymers used for powder coatings contain methyl methacrylate as the main constituent and up to 50% by weight of other copolymerizable lower alkyl esters of acrylic acid and methacrylic acid in which the alkyl group preferably contains 1–8 carbon atoms.

Typical examples of the copolymerizable lower alkyl acrylate esters and methacrylate esters which are used to form this preferred class of acrylic polymers are ethyl acrylate, propyl acrylate, butyl acrylate, 2-ethylhexyl acrylate, lauryl acrylate and the like; ethyl methacrylate, propyl methacrylate, butyl methacrylate, hexyl methacrylate, N,N-diethylaminoethyl acrylate, and the like. Other copolymerizable monomers which can be used are methacrylonitrile, acrylonitrile, styrene and vinyl acetate.

The acrylic polymer used to form the powder coatings which can be coalesced by the process of this invention can have pendent carboxyl constituents which are provided by α,β-unsaturated carboxylic acid monomers that are copolymerized with the aforementioned methacrylate monomers. One preferred acrylic polymer used as a powder coating composition which can be coalesced by the process of this invention contains about 0.1–3% by weight, and preferably, 0.2–1% by weight, based on the weight of the polymer, of polymerized α,β-unsaturated carboxylic acid units. Typically useful α,β-unsaturated carboxylic acid monomers are methacrylic acid, acrylic acid, itaconic acid, ethylacrylic acid, propylacrylic acid, isopropylacrylic acid and homologues of these acids. Methacrylic acid and acrylic acid are preferred since these acids form particularly high quality powder coatings.

The acrylic polymers used to form a powder which is coalesced by the process of this invention may also contain pendent hydroxyl groups which are obtained by copolymerizing hydroxyl alkyl acrylate or a hydroxyl alkyl methacrylate with the methacrylate monomers. Preferred hydroxyl containing acrylic polymers have about 2–20% by weight of the methacrylate polymer, and more preferably, about 5–15% by weight of the methacrylate polymer, of hydroxyalkyl acrylate or methacrylate. These hydroxyl containing acrylic polymers are used to form the coated substrates that can be treated by the novel process of this invention. Typically useful hydroxyalkyl acrylates and methacrylates contain about 2–8 carbon atoms in the alkyl group and are, for example, hydroxyethyl acrylate, hydroxypropylacrylate, hydroxybutyl acrylate, hydroxyoctyl acrylate, and the like, hydroxyethyl methacrylate, hydroxypropyl methacrylate, hydroxybutyl methacrylate, hydroxyhexyl methacrylate, hydroxyoctyl methacrylate, and the like.

Nitrogen containing acrylic and methacrylic esters, such as N,N-dimethylamino ethyl methacrylate, 3 - (2'-methacryloxyethyl)methyacryloxy, 2,2-spiro(cyclohexyl) oxazolidine (MESO) and the like, can be used to form the acrylic polymers used for powder coating compositions.

Graft copolymers are useful as powder coatings and can be coalesced according to the novel process of this invention. One preferred class of graft copolymers can be represented by the recurring unit structure A–B, where A is the backbone segment of the polymer and B is a graft segment, attached to A by a chemical bond.

The A portion of the polymer can be further represented by an a–b structure, i.e. the backbone is a copolymer composed of monomer units (a) and monomer units (b), where the (a) portion, i.e. the (a) monomer units, of the A segment is composed of monomer units from monomers of the general structure.

Formula 1

$$CH_2=\overset{R}{\underset{|}{C}}COOR_1$$

where $R$ is H, $CH_3$ or $-CH_2CH_3$
and
$R_1$ is an alkyl or cycloalkyl group of 1 through 18 carbon atoms.

These monomers are esters of acrylic acid, methacrylic acid and ethacrylic acid. Lower alkyl methacrylates, wherein the alkyl group has 1 through 4 carbons, such as methyl methacrylate, are especially preferred.

The (a) portion should constitute at least 85% by weight of the total A segment.

Although ordinarily the (a) portion will be composed entirely of these acrylic units referred to above, up to about 50% of its weight can consist of other monomers which do not contribute active grafting sites to the backbone. Illustrative of these are acrylic acid, methacrylic acid and their amides and nitriles; vinyl acetate; styrene; alpha methyl styrene; vinyl toluene, 3-(2-methacryloxyethyl)-2,2-spirocyclohexyloxazolidine, and the like.

The (b) portion, i.e. the monomer units (b), of the A backbone segment segment provides the potential active grafting sites, i.e. points for attachment for the B branch segment or segments.

The (b) portion of the A segment, which comprises up to 15%, preferably 0.2–5%, even more preferably 0.4–3%, by weight of the total A segment, can be any monomer units that provide available active grafting sites for graft polymerization. Representative of useful grafting site monomer units are those having the following general formula:

Formula 2

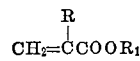

where
X can be $$-\overset{O}{\underset{\|}{C}}-O-$$

(the carbon atom in this group being attached directly to the backbone), $-O-$, or $-\overset{O}{\underset{\|}{C}}-$ Y can be hydrogen, $-CH_3$ or $-CH_2CH_3$;

$Z$ can be $-CH_2-\overset{R_2}{\underset{|}{C}}=CH-R_3$ where $R_2$ and $R_3$ are Y

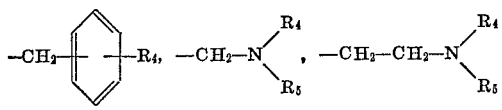

where $R_4$ and $R_5$ are H or alkyl of 1 through 4 carbon atoms,
or $$-CH_2-CH_2-O-R_6$$

where $R_6$ is alkyl of 1 through 4 carbon atoms;

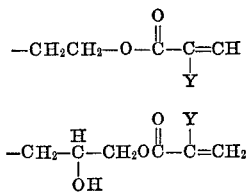

where Y has the same meaning as above;

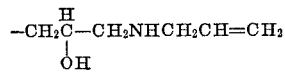

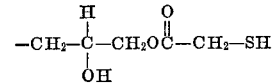

or

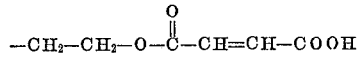

provided that when

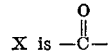

$Z$ can be $-H$ or $-NH-CH_2-CH=CH_2$ and provided further that the combined $-X-Z$ group can be

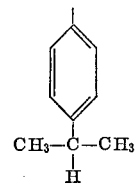

Allyl methacrylate and diethylaminoethyl methacrylate are preferred.

The B segment is the branch segment or branch segments of the graft copolymer. Like the (a) portion of the polymeric backbone segment A, the B segment of the graft copolymer molecule is composed of monomer units from monomers of the general structure of Formula 1 above.

As in the case of the (a) portion, the B portion of the graft copolymer molecule will ordinarily be composed entirely of acrylic units as mentioned above. However, up to about 50% by weight of the B portion can consist of other monomers which do not contribute active grafting sites to the backbone. Illustrative of these are acrylic acid, methacrylic acid and their amides and nitriles; vinyl acetate; styrene; alpha methyl styrene; vinyl toluene, 3-(2-methacryloxyethyl)-2,2-spirocyclohexyl-oxazolidine, and the like.

Especially preferred B segments are composed of 2-ethyl hexyl acrylate units, butyl acrylate units, or combinations of the two.

The B portion of the graft copolymer is always the branch segment and will not contain any significant amount of a component which provides active grafting sites such as previously indicated by (b).

As will readily be understood by persons in this art, preparation of graft copolymers described above will typically result in a mixture of polymer molecules, of varying number of grafted side chains per molecule. The average number of grafted B segments per A or backbone segment is ordinarily 0.5–5, preferably 1–2.

About 15–72% by weight, and preferably, about 20–40% by weight, based on the weight of the film-forming material of the coating composition, of cellulose acetate butyrate can be used with the aforementioned acrylic polymers to form powder coatings that can be coalesced by the novel process of this invention. Preferably, the cellulose acetate butyrate used in this invention has a viscosity of about 0.1–20.0 and more preferably, a viscosity of 2–5 seconds determined according to the method of ASTM-D-1343-56.

Preferably, organic plasticizers in amounts up to 50% by weight, but more preferably, up to about 30% by weight, based on the weight of film-forming ingredients, of organic plasticizers are used with the aforementioned acrylic polymers which gives a coating with excellent durability after coalescence by the process of this invention. The following are typical useful plasticizers: epoxidized soya bean oil, oil free and oil modified alkyds and polyesters, such as polyorthophthalate esters, polyalkylene adipate esters or polyarylene adipate esters, butylbenzyl phthalate, dibutyl phthalate, triphenyl phosphate, 2-ethylhexylbenzyl phthalate, dicyclohexyl phthalate, dibenzyl phthalate, butylcyclohexyl phthalate, mixed benzoic acid and fatty oil acid esters of pentaerythritol, poly(propylene adipate) dibenzotae, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexyl ester of hexamethylene diphthalate, di(methylcyclohexyl)phthalate. One preferred plasticizer of this group is butylbenzyl phthalate since it forms a coating with excellent balance of properties.

The following preferred acrylic polymer, when applied as a powder on suitably primed metal substrate and coalesced by the process of this invention, gives an excellent scratch and mar-free coating:

| | Weight percent |
|---|---|
| Polymethyl methacrylate | 10–20 |
| Copolymer of methyl methacrylate/N,N-diethylaminoethyl methacrylate | 10–20 |
| Copolymer of methyl methacrylate/butyl acrylate | 25–35 |
| Cellulose acetate butyrate 1–5 sec. viscosity | 15–25 |
| Coconut oil/ethylene glycol/phthalate anhydride alkyd resin | 20–25 |

The novel process of this invention is also applicable to several thermoplastic polymers which are later cross-linked by heating the polymer. These thermoplastic polymers are formed into powders by any of the aforementioned methods and applied to a substrate by any of the above procedures. These polymers are then coalesced by the novel process of this invention into a continuous film. After coalescence, these polymeric coatings are then baked at a high temperature to cross-link the polymer. Typical examples of such polymers are epoxy resins, thermosetting, vinyl and acrylic polymers, such as a blend of terpolymer of glycidyl methacrylate/styrene/acrylic acid and a heat reactive condensate, such as a melamine formaldehyde resin, alkylolated melamine formaldehyde resins, such as hexamethoxymethylol melamine, benzoguanamine formaldehyde resin, hexakismethoxymethyl melamine and the like.

Preferably, powdered polymer coatings used in this invention are pigmented. When the polymeric powder is formed, the polymer and the pigment are firmly adhered and as a result the powder particles contain both polymer and pigment evenly distributed in the powder particle. Examples of the great variety of pigments which are used are: metallic oxides, preferably titanium dioxide, zinc oxide and the like, metal hydroxides, metal flakes, metal powders, chromates, such as lead chromate, sulfides, sulfates, carbonates, carbon black, silica, talc, china clay, organic dyes, iron blues, organic reds, maroons, organic dyes, lakes and the like.

The process of this invention is also applicable to coalescing powder coatings on non-metal substrates, such as plastic, glass, wood and the like. Generally, powder coatings of acrylic esters for wood substrates contain about a major portion of methyl methacrylate, and may contain one or more of the aforementioned acrylic or methacrylic esters. One preferred composition contains 70–80% by weight of polymethyl methacrylate and 20–30% by weight of cellulose acetate butyrate.

Polymethacrylate esters having pendent carboxyl groups that are useful as powder coatings for wood substrates can be reacted with an alkylene imine such as taught in Simms U.S. 3,261,796, issued July 19, 1966. Powder coatings of these iminated polymethacrylate esters can also be coalesced by the novel process of this invention to form a continuous void free film.

Other powder coatings which can be coalesced by the process of this invention are, for example, ethylene/vinyl acetate copolymers containing about 40–70% by weight of vinyl acetate and complementally 60–30% by weight ethylene copolymer of vinyl acetate/vinyl chloride, polyvinyl chloride, polyvinylidene chloride, polysiloxanes, polyureas, polyurethanes, polycarbonates, polyesters, polystyrenes and copolymers of styrene, such as styrene/butadiene copolymers, butadiene/acrylonitrile copolymers, polyamides, polyamide/imides and the like.

One skilled in the art can readily determine the commercial advantages of the novel process of this invention and can recognize that a variety of equipment can be used to carry out this novel process. For example, if the novel process of this invention is used on an assembly line, the object would be placed on an endless conveyor, powder coated by one of the aforementioned techniques and the object would be passed through a chamber containing the desired partial pressure of coalescing vapor and then the object would pass through an oven to dry the coating.

Another aspect of this invention is that unsupported film and shaped articles can be formed from thermoplastic polymeric powders or particles by using the above described novel process. A self-supporting film can readily be formed by applying a thin layer of the thermoplastic polymeric powder to a surface to which the polymeric powder will not adhere after being coalesced with vapor according to the above described process, for example, polytetrafluoroethylene coated substrate or a silicone coated substrate may be used. After the powder is coalesced according to the above process, the film is dried and removed from the substrate.

Shaped articles may be made also by utilizing the above process. A thermoplastic polymeric material in the form of a powder or small beads is placed into a form and exposed to a coalescing vapor. If the polymeric material is only partially coalesced, an article having a porous structure is obtained similar to a glass frit. It may be possible to expose the article for a sufficient length of time to completely fuse the polymeric powder or particles on the surface of the article but only partially fuse the polymeric particles in the center of the article which would result in an opaque article. Sufficient exposure of the polymeric particles will cause a complete fusion of the particles and result in a relatively clear, void-free article. This aspect of the invention could be useful commercially for making a variety of shaped articles which are impossible to make by other known techniques.

The following examples illustrate the invention.

EXAMPLE 1

A coating composition is formulated by blending the following ingredients using standard mixing and blending techniques for preparing a paint

| | Parts by weight |
|---|---|
| Polymethyl methacrylate | 4.0 |
| Copolymer of methyl methacrylate/N,N - diethylaminomethyl methacrylate (weight ratio 99/1) | 4.4 |
| Copolymer of methyl methacrylate/butyl acrylate (weight ratio 82/18) | 8.5 |
| Cellulose acetate butyrate | 6.0 |
| Coconut oil/ethylene glycol/phthalic anhydride alkyd resin | 6.8 |
| Titanium dioxide pigment | 14.0 |
| Acetone | 11.2 |
| Toluene | 39.0 |
| Ethylene glycol monoethylether acetate | 5.8 |
| "Ethoquade" C-12-polyethoxylated quaternary ammonium chloride derived from a long-chain amine | 0.3 |
| Total | 100.0 |

The pigment is separately blended and dispersed in a portion of the polymer solution using a standard ball mill for about 4–8 hours. The pigment dispersion is then mixed with the aforementioned ingredients to form a coating composition.

The resulting coating composition has a total solids content of 33%. The coating is diluted to spray viscosity (40 sec. No. 1 Zahn cup viscosity) using a thinner of 22.5% acetone, 34.0% Cellosolve acetate, 43.5% toluene. The coating composition is then sprayed into a chamber with a warm air stream to flash the solvent vapors from the spray particles to form a finely divided powder which has a particle size of less than 40 microns. The powder is separated from the solvent vapor air stream and the powder is then collected. A steel panel primed with a 1.0 mil thick primer of an epoxy ester resin cross-linked with benzoguanamine and pigmented with aluminum silicate and barytes is dipped into a 1% aqueous solution of Arquad 1250 which is a mono-alkyl quaternary ammonium salt. A 1 mil thick powder coating is applied to the steel panel using a Ransburg Electro Powder Gun.

The following procedure is used to coalesce the above powder coating on the steel substrate. A heated vapor generating flask containing methylene chloride as the coalescing agent is connected to a vacuum oven. The panel, having a powder coating, is placed in the oven which is at about 25° C. and the oven is evacuated to a pressure of less than 1 inch mercury. The value to the vacuum is shut and the valve to the vapor generating flask is opened and methylene chloride vapors are admitted until a vapor pressure of 15 inches of mercury is reached in the oven. The oven is brought to atmospheric pressure by admitting air into the oven. The coated panel is then exposed to the solvent vapor for 5 minutes. The panel is removed from the oven and an examination reveals that the coating has coalesced. The panel is then baked at 90° C. for 10 minutes to harden the coating and to obtain a smooth and even coating.

Table I lists coalescing vapors or mixtures of coalescing vapors which can be used to coalesce the above powder coating applied to a primed steel substrate and which will give a final coated product in which the coating is smooth and even as described above.

EXAMPLE 2

The powder coating of Example 1 is sprayed onto a primed steel panel described in Example 1 using the same procedure and equipment as in Example 1. The resulting panel has a 1 mil thick coating. The coated panel is placed in a chamber at about 25° C., and methylene chloride vapors are slowly introduced until a partial pressure of 15 inches of mercury is reached. The panel is then removed and baked at 90° C. for about 15 minutes to harden the coating and to obtain a smooth and even coating.

EXAMPLE 3

A coating composition is formulated by blending the following ingredients:

| | Parts by weight |
|---|---|
| Polymethyl methacrylate | 21.10 |
| Cellulose acetate butylrate | 8.00 |
| Butylbenzyl phthalate | 10.90 |
| Silicone | 0.25 |
| Toluene | 38.93 |
| Acetone | 16.42 |
| Ethylene glycol monoethyl ether acetate | 4.10 |
| "Ethoquade" C-12-(described in Example 1) | 0.30 |
| Total | 100.00 |

The resulting coating composition is further diluted with the solvent mixture used in Example 1 to form a solution having about a 40 seconds No. 1 Zahn cup viscosity. A thin layer of "Arquad" 1250 described in Example 1 is applied to a mahogany wood substrate primed with a nitrocellulose sealer, a filler and a stain. A power coating of the above polymer is formed and applied as in Example 1 giving a powder coating on the wood substrate of about 2 mils thick.

The powder coated wood substrate is then exposed to methylene chloride solvent at a partial pressure of 15 inches mercury for 30 minutes at 44° C. using the same procedure as Example 1. The sample is removed and dried at 25° C. for 30 minutes. The resulting coating is continuous and void free and has an acceptable appearance.

EXAMPLE 4

A latex is prepared by conventional techniques and contains 37% polymer solids of polymethyl methacrylate. A 6 mil wet film of the latex is applied to a sanded aluminum panel and the panel is placed in a vacuum oven, held at 44° C. and a vacuum of 5 inches of mercury is applied. Methylene chloride vapors are admitted to the vacuum oven until a partial pressure of the vapor is about 25 inches of mercury. The panel is exposed for about 15 minutes under these conditions and the resulting coated metal substrate has a continuous film which is smooth and even and has an acceptable appearance. The panel is then baked at 90° C. for about 10 minutes to remove solvent and harden the coating.

EXAMPLE 5

A 96 mil thick wet film of a polymethyl metharcylate latex described in Example 4 is applied to a sanded aluminum panel and dried at 44° C. The resulting panel has a coating of a finely divided powder of polymethyl methacrylate about 2–3 mils thick. The panel is then placed into a vacuum oven and methylene chloride vapors are admitted until the vapor pressure is 25 inches of mercury. The panel is exposed for about 15 minutes under these conditions giving a continuous smooth even coating on the panel. The panel is then baked at 90° C. for about 10 minutes to remove solvents and harden the coating.

EXAMPLE 6

Beads of polymethyl methacrylate having a diameter in the range of 4–10 mils are charged into a pan having a volume of about 1.6 cubic inches. The pan and the polymer beads are placed in an oven at 45° C. for about 90 minutes and exposed to methylene chloride at a partial pressure of 25 inches of mercury. The pan is removed from the oven and an opaque cake-like structure resulting from the partial coalescence of the polymer particles if removed from the pan.

Longer exposure to the methylene chloride vapors can result in a complete coalescence of the polymer particles to form a clear rather than an opaque object. By using different molds, a variety of shaped objects can be formed. Also, the polymer beads could be placed on a metal substrate and then coalesced into a self-supporting, free film which may be opaque or clear depending on the degree of coalescence.

TABLE 1

| Coalescing vapor | | Exposure temp. (° C.) | Partial pressure (in. Hg) |
|---|---|---|---|
| Methylene chloride | | 45 | 20 |
| Acetone | | 45 | 14 |
| Benzene | | 45 | 7 |
| Acetonitrile | | 45 | 6 |
| Tetrahydrofuran | | 45 | 11 |
| Methanol | | 45 | 10 |
| Dichloromethane (b.p.=40.2° C.) | | 25 | 20 |
| Carbon tetrachloride (b.p.=76.8° C.) | | 90 | 22 |
| 1,2-dichloroethane (b.p.=83.5° C.) | | 100 | 30 |
| Trichloroethylene (b.p.=87.2° C.) | | 75 | 18 |
| 1,1,2-trichloroethane (b.p.=113.5° C.) | | 120 | 30 |
| Ethyl acetate (b.p.=77.2° C.) | | 60 | 8 |
| Butyl acetate (b.p.=126.1° C.) | | 80 | 6 |
| Methyl methacrylate | | 80 | 10 |
| Toluene (b.p.=110.6° C.) | | 120 | 20 |
| Methyl isobutyl ketone | | 120 | 20 |
| Dimethyl formamide (b.p.=152° C.) | | 130 | 15 |
| Water | Butyl acetate | 120 | 10/20 |
| Methanol | Methylene chloride | 25 | 7/11 |
| Hexane | do | 25 | 6/12 |
| Methyl isobutyl ketone | do | 120 | 10/20 |
| Toluene | Acetone | 120 | 20/5 |
| Do | do | 120 | 10/10 |

What is claimed is:

1. A process for forming a continuous polymeric coating on a substrate which comprises:
 (1) applying a coating of an essentially thermoplastic polymeric powder to a substrate wherein the polymeric powder comprises an acrylic polymer having a glass transition temperature of at least 20° C.,
 (2) exposing the coating of said polymeric powder to a temperature of about 20° C.–200° C. for about 30 sec.–5 minutes and to a selected partial pressure of a coalescing vapor for the polymeric powder, the selected partial pressure of said vapor being at least 0.5 inch mercury and up to 0.99 times the saturation vapor pressure, determined at the temperature at which the coating is being exposed,
 (3) absorbing sufficient coalescing vapor into the coating of polymeric powder to cause the powder particles to coalesce into a continuous coating, and reducing the viscosity of the coating to a viscosity of about 50,000–2,000,000 poises to form a smooth, even coating, and
 (4) drying the coalesced coating to remove solvent vapors.

2. The process of claim 1 in which the polymeric powder contains pigment particles.

3. The process of claim 2 in which the acrylic polymer is a methacrylate polymer containing methyl methacrylate as the main constituent and up to 50% by weight of a lower alkyl acrylate having 1–8 carbon atoms in the alkyl group and of a lower alkyl methacrylate having 2–8 carbon atoms in the alkyl groups.

4. The process of claim 2 in which the substrate is a metal substrate.

5. The process of claim 2 in which the coalescing vapor is selected from the group consisting of methylene chloride, acetone, benzene, acetonitrile, tetrahydrofuran, methanol, carbon tetrachloride, dichloroethane, trichloroethylene, trichloroethylene, ethyl acetate, butyl acetate, methyl methacrylate, toluene, methyl isobutyl ketone, dimethyl formamide, dimethyl acetamide, trifluoroacetic acid, ethylene glycol monomethyl ether acetate and mixtures thereof.

6. The process of claim 5 in which the acrylic polymer consists essentially of polymethyl methacrylate.

7. The process of claim 5 in which the polymeric powder consists essentially of polymethyl methacrylate blended with cellulose acetate butyrate and an organic plasticizer.

8. The process of claim 5 in which the acrylic polymer comprises a copolymer of a lower alkyl methacrylate and a lower alkyl acrylate.

9. The process of claim 8 in which said copolymer is of an alkyl methacrylate and an alkyl acrylate having 1–8 carbon atoms in the alkyl group.

10. The process of claim 5 in which the acrylic polymer is (1) polymethyl methacrylate; (2) a copolymer of methyl methacrylate and N,N-diethylaminoethyl methacrylate; or (3) a copolymer of methyl methacrylate and butyl acrylate and is blended with cellulose acetate butyrate and an alkyd resin plasticizer.

11. The process of claim 2 in which the acrylic polymer is a graft copolymer.

12. The process of claim 11 in which the acrylic graft copolymer comprises a backbone and one or more side chains, the backbone A being a polymeric segment of units (a) and up to 15% by weight of units (b) that provide available active grafting sites for graft polymerization, and each side chain being a polymeric segment of units B, A and B being different from each other, and (a) and B each being composed at least 50% by weight of units of esters of acrylic, methacrylic or ethacrylic acid.

13. The process of claim 12 wherein the (a) monomer units of the backbone A segment of the graft copolymer are methyl methacrylate; and the (b) monomer units of the backbone A segment are allyl methacrylate and diethylaminoethyl methacrylate and the monomer units of the B segment are units of 2-ethylhexyl acrylate.

14. The process of claim 12 wherein the (a) monomer units of the backbone A segment of the graft copolymer are methyl methacrylate and the (b) monomer units of the backbone A segment are allyl methacrylate and diethylaminoethyl methacrylate and the monomer units of the B segment are units of 2-ethylhexyl acrylate.

15. The process of claim 2 in which the substrate is wood.

16. The process of claim 15 in which the powder coating consists essentially of a blend of 70–80% by weight polymethyl methacrylate and 20–30% by weight cellulose acetate butyrate.

17. The process of claim 1 in which the thermoplastic polymeric powder coating is exposed to a coalescing vapor wherein said vapor is introduced initially at a vapor pressure of 0.5 inch of mercury and the vapor is continuously introduced until said vapor pressure reaches 0.99 times the saturation vapor pressure, measured at the temperature at which the process is being operated.

References Cited

UNITED STATES PATENTS

| | | | |
|---|---|---|---|
| 2,271,192 | 1/1942 | Hinz | 117—63 |
| 2,922,230 | 1/1960 | Carlson | 117—17.5 |
| 3,117,847 | 1/1964 | Norton | 117—17.5 |
| 3,565,665 | 2/1971 | Stranch et al. | 117—63 |

WILLIAM D. MARTIN, Primary Examiner

R. M. SPEER, Assistant Examiner

U.S. Cl. X.R.

117—63, 132 C, 148

PO-1050
(5/69)

UNITED STATES PATENT OFFICE
CERTIFICATE OF CORRECTION

Patent No. 3,676,172    Dated July 11, 1972

Inventor(s) John W. Van Dyk and Dao-Tsing Wu

It is certified that error appears in the above-identified patent and that said Letters Patent are hereby corrected as shown below:

Claim 5, line 72, column 11, after "acid,"
insert -- ethylene glycol monoethyl ether acetate --.

Claim 14, column 12, line 65, delete period (.)
after "acrylate" and insert -- and butyl acrylate --.

Signed and sealed this 9th day of January 1973.

(SEAL)
Attest:

EDWARD M. FLETCHER, JR.
Attesting Officer

ROBERT GOTTSCHALK
Commissioner of Patents